United States Patent [19]

Gerbasi

[11] 3,954,259
[45] May 4, 1976

[54] DOUBLE BAR SEPARATOR FOR A SHEET RECEIVING TRAY

[75] Inventor: Dennis P. Gerbasi, Webster, N.Y.

[73] Assignee: Xerox Corporation, Stamford, Conn.

[22] Filed: Nov. 25, 1974

[21] Appl. No.: 527,108

[52] U.S. Cl. .................................. 271/4; 271/178; 278/220
[51] Int. Cl.² ........................................ B65H 31/26
[58] Field of Search .............. 271/4, 178, 180, 181, 271/220, 3.1

[56] References Cited
UNITED STATES PATENTS

| | | | |
|---|---|---|---|
| 813,809 | 2/1906 | Maynard | 271/178 |
| 1,183,761 | 5/1916 | Parrish | 271/178 |
| 2,251,221 | 7/1941 | Cleven | 271/178 |
| 3,630,515 | 12/1971 | Knapp | 271/4 |

Primary Examiner—John J. Love
Assistant Examiner—Robert Saifer

[57] ABSTRACT

An automatic document handler for supplying and removing documents from the platen of a processing apparatus such as a copying machine. The document handler includes a document supply tray adapted for holding documents awaiting copying and for receiving documents returned thereto from the platen after copying thereof. To assure a clear return path into the tray for documents returned from the platen and prevent contact by the returned document with documents previously returned to the tray, a rotatable double bar separator is employed, each document returned being received in the space defined between the two bars of the separator. Prior to the receipt of the next document in the return tray, the double bar separator is rotated 180° to remove the previously returned document from between the bars and hold the document against the stack of documents in the tray to provide a clear path for receipt of the next document therein.

2 Claims, 1 Drawing Figure

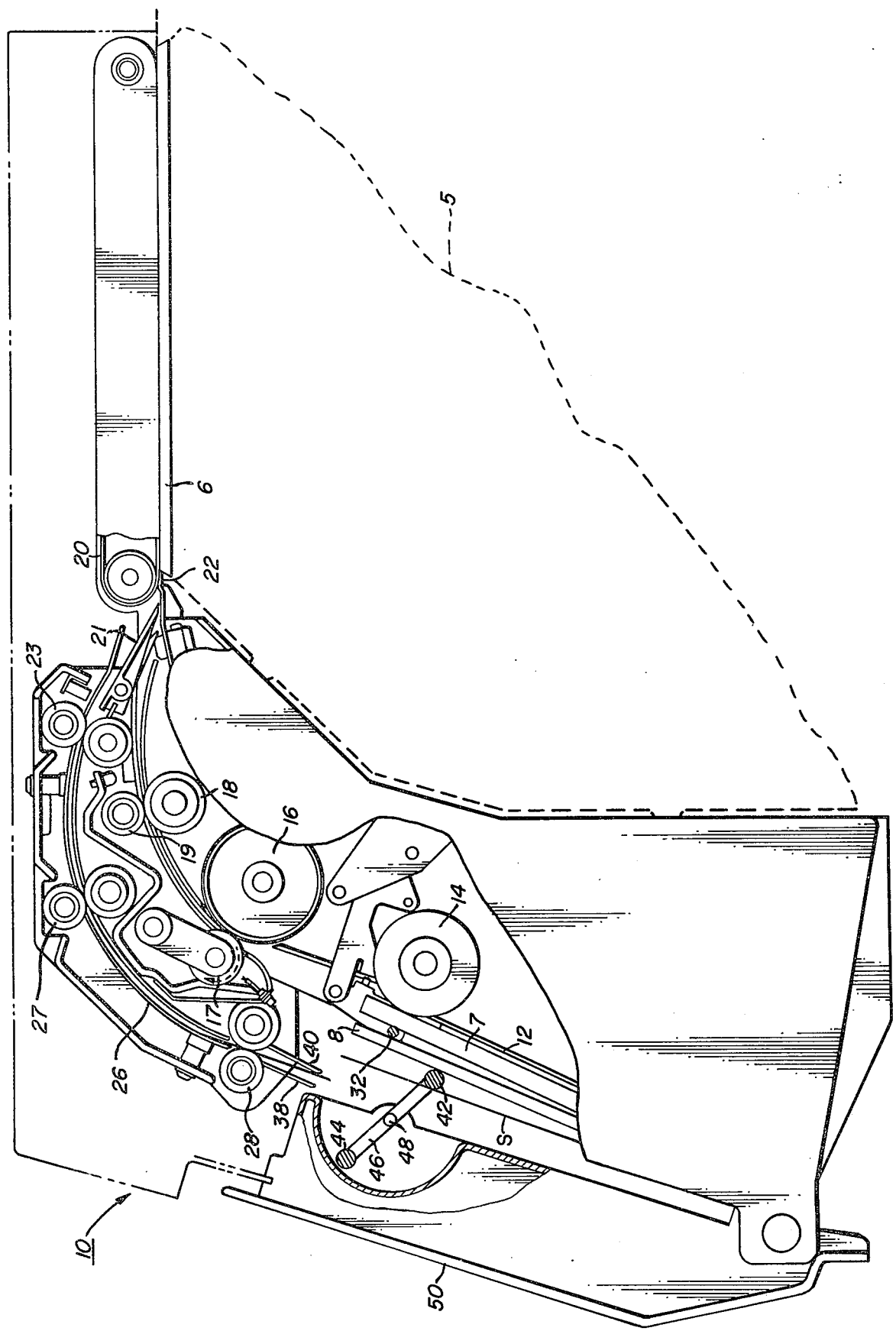

DOUBLE BAR SEPARATOR FOR A SHEET RECEIVING TRAY

BACKGROUND OF THE INVENTION

With the advent of high speed copiers, such as xerographic reproduction machines, automatic document handlers have become a necessity to rapidly place and remove documents from the platen of the copy machine to enable the machine to produce copies at its full potential. The document handler must first separate the document to be copied from others awaiting copying. Following this, the document must be brought into position on the machine platen and located in a certain position to assure the making of a complete and visably acceptable copy. After the document has been copied, it is returned to the document supply tray. To maximize copy output, the documents must be handled rapidly and with great care to prevent damage to mutilation thereto since the documents may be one of a kind and/or irreplaceable. One of the problems that has heretofore been encountered is in assuring that the documents returned to the document tray have properly settled therein and are clear of the document return path so that subsequent documents do not collide with previously returned documents causing damage thereto or jamming the automatic document handler. This problem has been addressed in a number of ways. For example, in U.S. Pat. No. 3,790,158, granted Feb. 5, 1974 to James E. Summers et al and assigned to the assignee of the present application, a fan in the return tray area is employed to discharge a low pressure stream of air downwardly onto the documents therebelow in the tray assembly to move the returned documents clear of the document return path into the tray. As a further safeguard, a sheet sensing device is also employed to prevent return of subsequent documents if for any reason a document is not cleared from the return path by the low pressure air stream. While this system has proved quite satisfactory, in the event that the sensor does disable the document feeder due to the presence of a returned document in the document return path, the operator must check the document tray and correct the situation before the machine is allowed to continue operation and valuable machine time may be lost.

SUMMARY OF THE INVENTION

This invention relates to an apparatus for feeding documents to an automatic copying machine from a document supply tray and returning the documents thereto, documents returned to the tray being fed between the bars of a double bar separator, the separator being adapted for rotation through 180° after receipt of each returned document to positively force the returned document against the stack of returned documents and prepare the tray for receipt of subsequent documents being returned thereto.

BRIEF DESCRIPTION OF THE DRAWING

The FIGURE is a side view in cross section showing a document handler incorporating the improved double bar separator in the return tray thereof to assure positive removal of returned documents from the document return path.

DESCRIPTION OF THE PREFERRED EMBODIMENT

Referring to the drawing, there is shown a document handler designated generally by the numeral 10 incorporating the double bar separator of the present invention. Document handler 10 may be used with any suitable document processing apparatus such as a reproduction machine 5 which has a platen 6 on which the document to be copied is placed. Document handling apparatus 10 includes a supply tray 12 storing both documents 7 to be copied and documents 8 which have already been copied. From tray 12, one document at a time is advanced from the bottom of supply 7 by an intermittently operated primary feed roll 14 into the nip of retard roll pair 16, 17. The lower roll 16 is driven in a document feeding direction while the upper roll 17 is driven in the reverse or document reject direction (as shown by the dotted line arrow in FIG. 1) through a suitable slip coupling which normally enables the lower roll 16 to override the reverse drive input to roll 17 and thereby turn roll 17 in the document feeding direction. However, if two or more documents enter the nip of roll pair 16, 17, the reduced friction between the overlapping documents reduces the frictional drive force between roll pair 16, 17 permitting the slip clutch to engage and drive roll 17 in the reverse, document rejecting direction.

The document emerging from retard roll pair 16, 17 passes into the nip of intermediate roll pair 18, 19 and from there underneath deflector plate 21 to platen transport 20. Transport 20 which comprises a belt type conveyor, first carries the document forward onto platen 6 until the entire document is positioned thereon.

Transport 20 is then reversed to bring the document trailing edge against register 22. Register 22 locates the document in copying position following which the copy or copies are made by the copying apparatus 5.

When copying is completed, platen transport 20 is again started in reverse to move the document backwards off platen 6, register edge 22 being previously retracted for this purpose. Deflector 21, which is lowered when register edge 22 is retracted, guides the returning document upwardly into the nip of return roll pair 23. Roll pair 23 moves the document along suitable return guides 26 through second and third return roll pairs 27, 28 respectively, and back into tray 12.

To maintain copied documents which have been designated for convenience by the numeral 8, segregated from documents 7 awaiting copying, and prevent inadvertent or premature refeeding of the returned documents 8 by feed roll 14 following feed of the last one of the documents 7, a displaceable bail or separator bar 32 is provided. Bail 32 is disposed substantially opposite to and above primary feed roll 14 to prevent documents resting thereon from contacting roll 14. Bail 32 may be reset onto the top of the documents in tray 12 when it is desired to refeed the documents to copying machine 5. For a complete description of mechanisms suitable for moving the bail bar 32, register 22, deflector 21, and the various other mechanisms of the automatic document handler, reference may be had to the aforementioned U.S. Pat. No. 3,790,158.

Documents returned to the tray are directed by guide members 38, 40 between bars 42 and 44 of a double bar separator mechanism including the bars 42 and 44, which may be secured on suitable cross bars 46 (only one of which is visible in the drawing) at each end of bars 42 and 44. Each of the cross bars 46 is provided with a shaft 48 parallel to the bars 42, 44, the shafts 48 being suitably journaled in the side walls of the document tray cover 50. The shafts 48 are adapted to be rotated through 180° increments by suitable means such as a stepper motor or rotary solenoid for reasons to be explained hereinafter.

When a document or sheet is returned to the supply tray, it will initially reside between the two bars 42 and 44 as illustrated by the sheet S in the drawings. At a suitable point in the automatic document handler cycle, for example, when the register edge is dropped to allow return of a subsequent document to the tray, the stepper motor or rotary solenoid is actuated to cause the double bar separator mechanism to rotate 180° in a counterclockwise direction. This will cause the mechanism to move from the position illustrated in the drawing to swing bar 42 up over the top of the document resting between bar 42 and 44 and cause bar 44 to positively displace the sheet that was previously between the bars against the stack 8 and provide a clear path between bars 42 and 44 for receiving the next document returned to the tray. The double bar separator mechanism thus provides a clear path for returning documents while positively moving the documents returned therebetween against the stack of documents 8 to prevent any possibility of document jam in the return tray area.

Although the novel sheet separator is described in conjunction with an automatic document handler, it should be understood that the separator is applicable to any sheet receiving tray or bin adapted to receive sheets seriatim.

While I have described a preferred embodiment of my invention it should be understood that the invention is not limited thereto but may be otherwise embodied within the scope of the following claims.

What is claimed is:

1. An automatic document handler adapted for placing documents from a document stack onto a platen of a reproduction machine and removing the document therefrom after the document has been copied including:
    a document tray adapted to receive a stack of documents to be copied;
    means for feeding documents sequentially from said document tray to the platen of the copy machine and returning the documents thereto;
    means defining a return document path from the platen of the copy machine to the document tray;
    two parallel rods;
    linking means connecting said rods at the ends thereof; and
    pivot means connected to said linking means, the axis of said pivot means being parallel to said rods at a location midway between said rods, said rods and linking means defining a throat for receiving individual documents therein, said rods and said linking means being located near the trail edge of a document when the document is fully fed therein, rotation of said linking means through an arc of 180° causing one of said rods to pass over the trail edge of the document in said throat, the other rod forcing the document against the previously received documents in said document tray to positively hold said documents in said tray and clear said throat for receipt of the next document fed to said tray.

2. A tray assembly adapted to receive sheets seriatim for collection in a sheet stacking tray including rotatable throat means disposed adjacent the tray for receipt of sheets supplied to the tray, said throat means comprising:
    two parallel rods;
    linking means connecting said rods at the ends thereof;
    pivot means connected to said linking means, the axis of said pivot means being parallel to said rods at a location midway between said rods, said rods and linking means defining said throat for receiving individual sheets therein, said rods and said linking means being located near the trail edge of a sheet when the sheet is fully fed therein, rotation of said linking means through an arc of 180° causing one of said rods to pass over the trail edge of the sheet in said throat, the other rod forcing the sheet against the previously received sheets in the stacking tray to positively hold said sheets in the tray and clear said throat for receipt of the next sheet fed to the tray.

* * * * *